United States Patent
Crawford et al.

(10) Patent No.: US 10,042,095 B2
(45) Date of Patent: Aug. 7, 2018

(54) DUAL MODE OPTICAL AND RF REFLECTOR

(71) Applicant: RAYTHEON COMPANY, Waltham, MA (US)

(72) Inventors: John Okerson Crawford, Vail, AZ (US); David C. Cook, Oro Valley, AZ (US); Patrick L. McCarthy, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 124 days.

(21) Appl. No.: 14/813,635

(22) Filed: Jul. 30, 2015

(65) Prior Publication Data

US 2017/0031068 A1 Feb. 2, 2017

(51) Int. Cl.
| | |
|---|---|
| *H01Q 15/16* | (2006.01) |
| *G02B 5/10* | (2006.01) |
| *G02B 27/30* | (2006.01) |
| *H01Q 19/13* | (2006.01) |
| *H01Q 5/22* | (2015.01) |
| *F41G 7/00* | (2006.01) |

(52) U.S. Cl.
CPC ............. *G02B 5/10* (2013.01); *G02B 27/30* (2013.01); *H01Q 5/22* (2015.01); *H01Q 15/16* (2013.01); *H01Q 19/132* (2013.01); *F41G 7/003* (2013.01); *F41G 7/004* (2013.01)

(58) Field of Classification Search
CPC ......... H01Q 5/22; H01Q 19/132; H01Q 15/16
See application file for complete search history.

(56) References Cited

U.S. PATENT DOCUMENTS

| | | | |
|---|---|---|---|
| 2,892,982 A | 6/1959 | Allen | |
| 3,274,603 A | 9/1966 | Kay | |
| 4,228,410 A | 10/1980 | Goudey et al. | |
| 4,247,858 A | 1/1981 | Eichweber | |
| 4,282,527 A | 8/1981 | Winderman et al. | |
| 4,477,814 A * | 10/1984 | Brumbaugh | H01Q 21/20 |
| | | | 342/53 |
| 4,636,797 A | 1/1987 | Saffold et al. | |
| 4,652,885 A | 3/1987 | Saffold et al. | |
| 4,860,016 A * | 8/1989 | Westphal | F41G 7/003 |
| | | | 342/165 |
| 5,012,250 A * | 4/1991 | Foley | F41J 2/02 |
| | | | 342/165 |

(Continued)

OTHER PUBLICATIONS

Aramaki, et al., "Ultra-Thin Broadband OMT with Turnstile Junction", IEEE MTT-S Digest, 2003, pp. 1-4.

(Continued)

*Primary Examiner* — Dameon E Levi
*Assistant Examiner* — Ab Salam Alkassim, Jr.
(74) *Attorney, Agent, or Firm* — Lando & Anastasi, LLP

(57) ABSTRACT

A dual-mode optical and RF reflector, and test system using the same. In one example the reflector is a mirror having a reflective surface including a first zone having a first surface precision, wherein a remainder of the reflective surface outside of the first zone has a second surface precision that is substantially lower than the first surface precision, the mirror being configured to collimate and reflect an RF signal from the reflective surface, and to collimate and reflect an optical signal from the first zone.

16 Claims, 11 Drawing Sheets

(56) References Cited

U.S. PATENT DOCUMENTS

| | | | | |
|---|---|---|---|---|
| 5,182,564 | A * | 1/1993 | Burkett | F41G 7/008 342/53 |
| 5,214,438 | A | 5/1993 | Brusgard et al. | |
| 5,247,843 | A * | 9/1993 | Bryan | F42B 35/00 250/492.1 |
| 5,268,680 | A * | 12/1993 | Zantos | F41G 7/008 342/53 |
| 5,307,077 | A * | 4/1994 | Branigan | G01S 13/4463 342/53 |
| 5,327,149 | A * | 7/1994 | Kuffer | G01S 13/86 342/53 |
| 5,508,712 | A * | 4/1996 | Tom | H01Q 1/125 333/254 |
| 5,581,267 | A * | 12/1996 | Matsui | H01Q 19/10 343/753 |
| 5,635,944 | A | 6/1997 | Weinstein et al. | |
| 6,225,955 | B1 * | 5/2001 | Chang | H01Q 19/13 343/720 |
| 6,307,521 | B1 * | 10/2001 | Schindler | G01S 13/86 342/53 |
| 6,735,369 | B2 | 5/2004 | Komachi et al. | |
| 6,801,172 | B1 * | 10/2004 | Schwengler | H01Q 19/19 343/781 CA |
| 8,368,608 | B2 * | 2/2013 | Parsche | H01Q 15/0006 343/700 MS |
| 9,019,164 | B2 * | 4/2015 | Brandau | H01Q 19/193 343/781 CA |
| 9,761,941 | B2 * | 9/2017 | Griffith | H01Q 5/22 |
| 9,865,921 | B2 * | 1/2018 | Griffith | H01Q 5/22 |
| 2004/0070549 | A1 * | 4/2004 | Thornburgh | H01Q 1/288 343/915 |
| 2006/0008274 | A1 * | 1/2006 | Wilcken | H01Q 3/2676 398/115 |
| 2006/0201547 | A1 * | 9/2006 | Rogers | B64G 1/428 136/201 |
| 2010/0127113 | A1 * | 5/2010 | Taylor | F41G 7/008 244/3.16 |
| 2011/0061251 | A1 * | 3/2011 | Mahajan | G01C 3/04 33/278 |
| 2011/0262145 | A1 * | 10/2011 | Ruggiero | G02B 17/0856 398/115 |
| 2012/0002973 | A1 * | 1/2012 | Bruzzi | H01Q 13/0208 398/116 |
| 2012/0298873 | A1 * | 11/2012 | Hernandez | F41G 7/008 250/353 |
| 2012/0326939 | A1 * | 12/2012 | Cannon | H01Q 19/027 343/840 |
| 2014/0266934 | A1 * | 9/2014 | Cook | H01Q 1/44 343/720 |
| 2014/0327596 | A1 * | 11/2014 | Darooka | H01Q 15/0033 343/904 |
| 2015/0167140 | A1 * | 6/2015 | Lavagna | H01Q 15/16 428/337 |
| 2015/0357713 | A1 * | 12/2015 | Griffith | G02B 6/4225 343/720 |
| 2016/0164190 | A1 * | 6/2016 | Daurer | H01Q 9/40 343/770 |

OTHER PUBLICATIONS

Navarrini et al., "A Turnstile Junction Waveguide Orthomode Transducer", Jan. 2006, IEEE, vol. 54, pp. 272-273.

Pisano, et al., "A Broadband WR10 Turnstile Junction Orthomode Transducer", IEEE Microwave and Wireless Components Letters, vol. 17, No. 4, Apr. 2007, pp. 1-3.

International Search Report and Written Opinion for PCT/US2016/033032 dated Aug. 19, 2016.

* cited by examiner

DUAL MODE OPTICAL AND RF REFLECTOR

BACKGROUND

Antenna "ranges" or anechoic chambers are used for testing a wide variety of devices. Many types of units under test (UUT), such as multi-mode seekers, for example, operate, and therefore must be tested, at multiple wavelengths. Conventional systems for testing such devices include a number of spatially distributed discrete signal sources that provide multiple wavelength signals and are subject to mis-alignment in position and angle. Typically these sources cannot be easily co-located or angularly co-aligned. Alternatively, discrete tests can be performed at different test stations configured to operate at different wavelengths. However, such test facilities require either or both of significant metrology to calibrate the alignment between UUT and test source in each measurement chamber, or significant floor space so as to move the sources far a-field from the multimode seeker UUT. Another known structure is disclosed in U.S. Pat. No. 5,012,250, which discloses an infrared (IR) radiator disposed in a center of an RF (radio frequency) horn radiator to provide an IR and an RF source. However, such structure suffers from compromised performance due to numerous infirmities including blockage imposed by the IR source in the RF radiator.

SUMMARY OF INVENTION

Aspects and embodiments are directed to a dual-mode optical and RF reflector, embodiments of which may be used in conjunction with optical and RF test signal sources to provide a high performance alignment system.

According to one embodiment, a dual-mode optical and radio frequency (RF) reflector comprises a mirror having a reflective surface including a first zone having a first surface precision, wherein a remainder of the reflective surface outside of the first zone has a second surface precision that is substantially lower than the first surface precision, the mirror being configured to collimate and reflect an RF signal from the reflective surface, and to collimate and reflect an optical signal from the first zone.

In one example the reflective surface has an off-axis parabolic shape. The first zone may be substantially centrally located in the reflective surface. Alternatively, the first zone may be offset relative to a center of the reflective surface. In one example the first zone has a diameter of approximately 250 millimeters.

In one example the mirror includes a first layer of aluminum and a second layer nickel disposed on the first layer of aluminum.

In another example the first surface precision is in a range of $\lambda/2$ to $\lambda/10$ RMS surface deviation, $\lambda$ being the wavelength of the optical test apparatus, typically 632.8 nm±2 nm.

Another embodiment is directed to a multi-mode alignment test system comprising a test chamber, a multi-mode signal emitter configured to emit at least a radio frequency (RF) signal and an optical signal, and a dual-mode optical and RF reflector. The dual-mode optical and RF reflector includes a reflective surface configured to collimate and reflect the first RF signal into a test volume within the test chamber, and a zone within the reflective surface and corresponding to a portion of the reflective surface that is less than an entirety of the reflective surface, the zone being configured to collimate and reflect the optical signal into the test volume.

In one example the zone has a first surface precision, and a remainder of the reflective surface outside of the first zone has a second surface precision that is substantially lower than the first surface precision.

In another example the multi-mode signal emitter is configured to emit the RF signal and the optical signal coincident with one another and with a common phase center.

The dual-mode optical and RF reflector may include a mirror having the reflective surface, for example. In one example the mirror has a bi-metallic structure. For example, the minor may include an aluminum substrate and a layer of nickel disposed on the aluminum substrate, the layer of nickel being polished to provide the reflective surface. In another example, the minor can be made from heat-treated and thermally stabilized aluminum.

In one example the dual-mode optical and RF reflector has an off-axis parabolic shape. In one example the zone is approximately centrally located within the reflective surface. In another example the zone is offset from a center of the reflective surface. In certain examples the test system is configured for testing an article including an optical system having a central obscuration. Accordingly, a size and a decenter of the zone can be selected such that optical signal reflected from the zone is not blocked by the central obscuration.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to a dual-mode optical and RF reflector, which may be used in a folded antenna test range, for example. The reflector positions the RF and optical signals received from the respective sources such that the sources are geometrically presented with solid angles equivalent to the desired far-field position. As discussed further below, in certain examples, the RF and optical sources are included within a co-aligned tri-mode source, embodiments of which are disclosed in commonly-owned co-pending U.S. patent application Ser. No. 13/803,402 titled "MULTI-MODE SIGNAL SOURCE" published as US PG-Pub. No. 2014-0266934, which is herein incorporated by reference in its entirety for all purposes. The dual-mode optical and RF reflector may provide coincident optical and RF signals necessary to create a co-alignment test system. The alignment problem addressed by certain aspects and embodiments is conventionally typically avoided through the use of less accurate and more time-consuming multi-step alignments, as discussed above. However, this conventional approach does not achieve single-step co-alignments, as may be achieved using embodiments of the system disclosed herein. Additionally, aspects and embodiments may allow for the implementation of better aligned RF systems through the use of embedded optical alignment techniques, as discussed in more detail below.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 1:
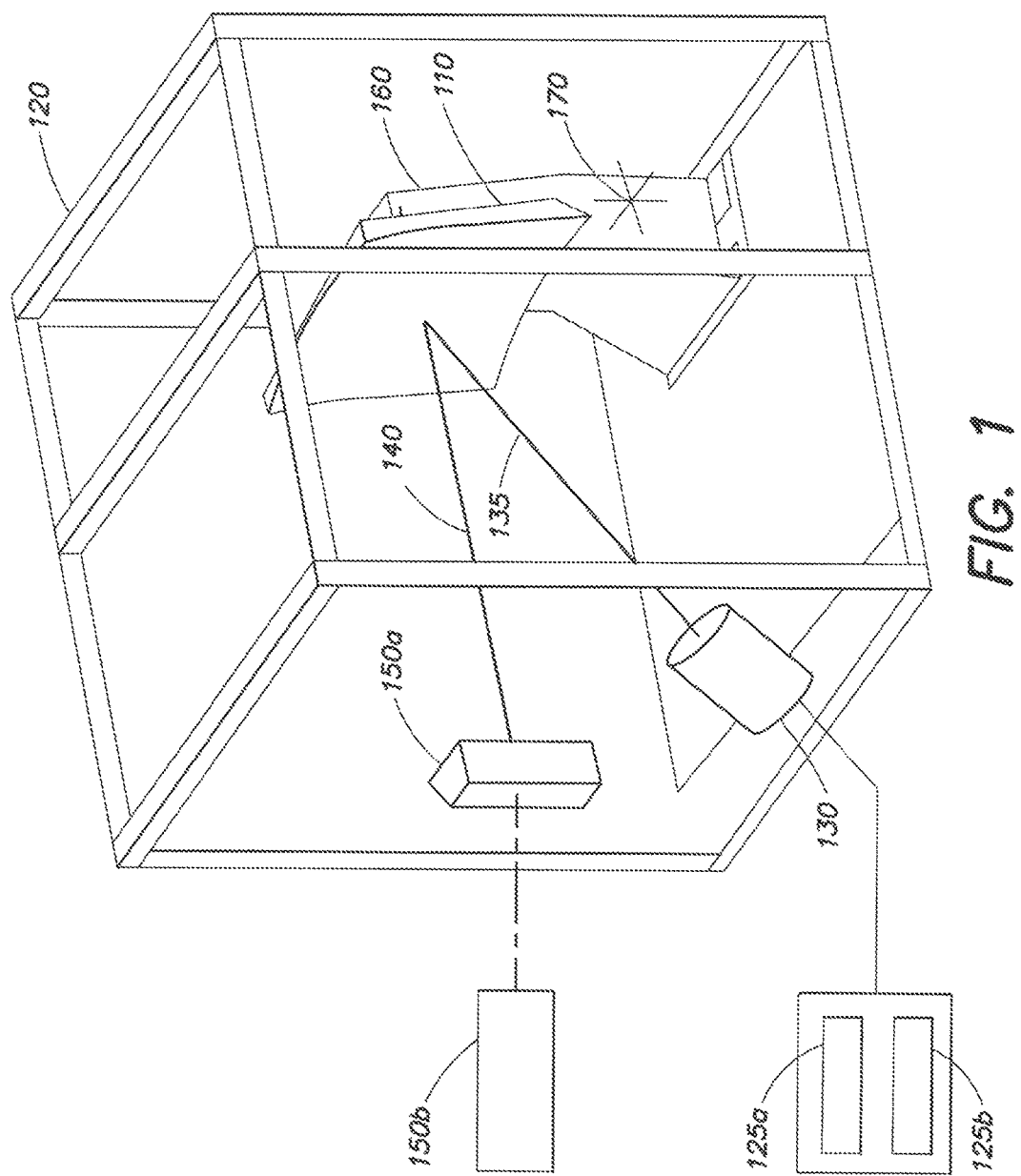
FIG. 1 is a schematic diagram of one example of a test chamber including a dual-mode optical and RF reflector according to aspects of the present invention.

Referring to FIG. 1, there is illustrated a schematic diagram of one example of a folded, compact antenna range/test system according to one embodiment. The system includes the dual-mode optical and RF reflector 110, which in operation may be positioned within a test chamber 120, as shown in FIG. 1. A signal emitter 130 is provided, also typically located within the test chamber 120, and configured to produce a signal radiated along axis 135. The signal emitter 103 is connected to one or more signal sources, generally located outside of the test chamber 120, as discussed further below. A reflected signal along axis 140 (reflection of the signal along axis 135) is reflected from the dual-mode reflector 110 to a unit under test (UUT) configured to receive and analyze the reflected signal, as discussed further below. In the illustrated example the UUT includes a first portion 150a at least partially located within the test chamber 120, and a second portion 150b located outside the test chamber 120 and communicatively coupled to the first portion 150a. However, those skilled in the art will appreciate, given the benefit of this disclosure, that the UUT (collectively identified herein as UUT 150) may be entirely co-located, or may include numerous connected components, not limited to the two portions and/or two locations illustrated in FIG. 1. The dual-mode reflector 110 may be mounted to a mount 160 which holds the reflector in position within the test chamber 120, and which may optionally allow for repositioning (e.g., tilting, rotation, lateral or vertical movement, etc.) of the reflector.

In one embodiment, the system is configured to provide coincident RF and optical signals necessary to implement a co-alignment test system. Accordingly, the dual-mode optical and RF reflector 110 is configured to simultaneously relay an optical alignment beacon and an RF signal into a test volume (in which the first portion 150a of the UUT may be located, for example). According to one embodiment, the signal emitter 130 is the source of both the optical beacon and the RF signal, which are collectively illustrated in FIG. 1 as emitted along source signal axis 135.

In particular, according to one embodiment, the signal emitter 130 is a multi-band signal emitter that provides at least two or more co-aligned, spherical waves (e.g., optical and RF) when either placed at a focal point of collimating optics or placed in the far-field from a device that will receive the multiple signals. As discussed above, the signal emitter 130 may be connected to different frequency band signal sources that are co-located so as to radiate from the same location in space, and the emitter may be configured such that the signals from the various sources are co-aligned and radiating in the same direction. As such, the signal emitter 130 may radiate at least two or more co-aligned, spherical waves with the substantially the same phase center. For example, in the example illustrated in FIG. 1, the multimode signal emitter 130 is connected to a radio frequency (RF), microwave (μw), and/or millimeter wave (mmW) signal source 125a and a multi-wavelength optical signal source 125b. The signal source 125a is generally referred to herein as an RF source; however, it is to be appreciated that this signal source may transmit any one or more of an RF signal, a μW frequency signal, and/or a mmW signal. The RF source 125a may be used simultaneously with the optical signal source 125b, such that the multiple signals can be transmitted to the signal emitter 130 and either simultaneously or alternately radiated, and the signals can be radiated in any combination. The optical source 125b may include one or more monochromatic sources, broadband optical emitters, lasers emitting at infrared (IR) or SAL wavelengths, or the like. The optical source 125b is not limited to the type of source that requires an optical waveguide or other impedance matched transmission component to transfer optical emissions from the source to the signal emitter 130. As noted above, the optical source 125b may include a black body or broadband optical emitters with sufficient emissions in a waveband received by the UUT. Operated together, the RF source 125a and optical source 125b may provide an optical signal and RF signal with a common phase center. It is further to be appreciated that the signals can be amplitude and/or phase modulated signals to provide any of continuous wave (CW) signals, pulsed signals, and with various polarizations as will be readily apparent to one of skill in the art.

As noted above, in one embodiment, the multi-mode signal emitter 130 is part of or connected to a co-aligned tri-mode source, embodiments of which are disclosed in commonly-owned co-pending U.S. patent application Ser. No. 13/803,402 titled "MULTI-MODE SIGNAL SOURCE" published as US PG-Pub. No. 2014-0266934. The multi-mode signal emitter 130 thus provides a common co-located RF-optical source signal along axis 135 to be relayed into the test volume by the dual-mode optical and RF reflector 110. The multi-mode signal emitter 130 and dual-mode reflector 110 may be used together to create an RF/optical co-alignment test system. For example, still referring to FIG. 1, the multi-mode signal emitter 130 may be used together with the dual-mode optical and RF reflector 110 in a compact measurement range to test a UUT, such as a multimode seeker. In certain examples, the multi-mode source 130 radiates common phase center, spherical wave signals, including any combination of RF, µW, mmW, IR, and/or SAL signals, (collectively illustrated and generally referred to as RF/optical source signal) to the dual-mode reflector 110, which reflects any of the RF, µW, mmW, IR and SAL signals as co-aligned plane wave signals, collectively illustrated and referred to herein as reflected signal 140. The combination of the signal emitter 130 and the dual-mode reflector 110 can be controlled to provide co-aligned plane wave reflected signals having various amplitude, phase and polarization characteristics, and radiating with a common phase center toward UUT 150. Thus, coincident RF and optical signals may be provided, thereby enabling implementation of a co-alignment test system.

In certain embodiments, it may be preferable for the co-alignment test system to include a collimated test zone, meaning that the source(s) of the RF and optical signals appear to be located geometrically, as far as radiometric solid angles are concerned, at a significant distance (in the far field). Accordingly, the dual-mode reflector 110 may be a minor configured to collimate RF and optical (e.g., IR) beams and simulate "far-field" performance with the signal emitter 130 apparently (although not in actuality) located at infinity. To accomplish this, the dual-mode reflector 110 may have the shape of an off-axis parabola (OAP), with the multi-mode signal emitter 130 located at the focus of the parabola.

Figure 2:
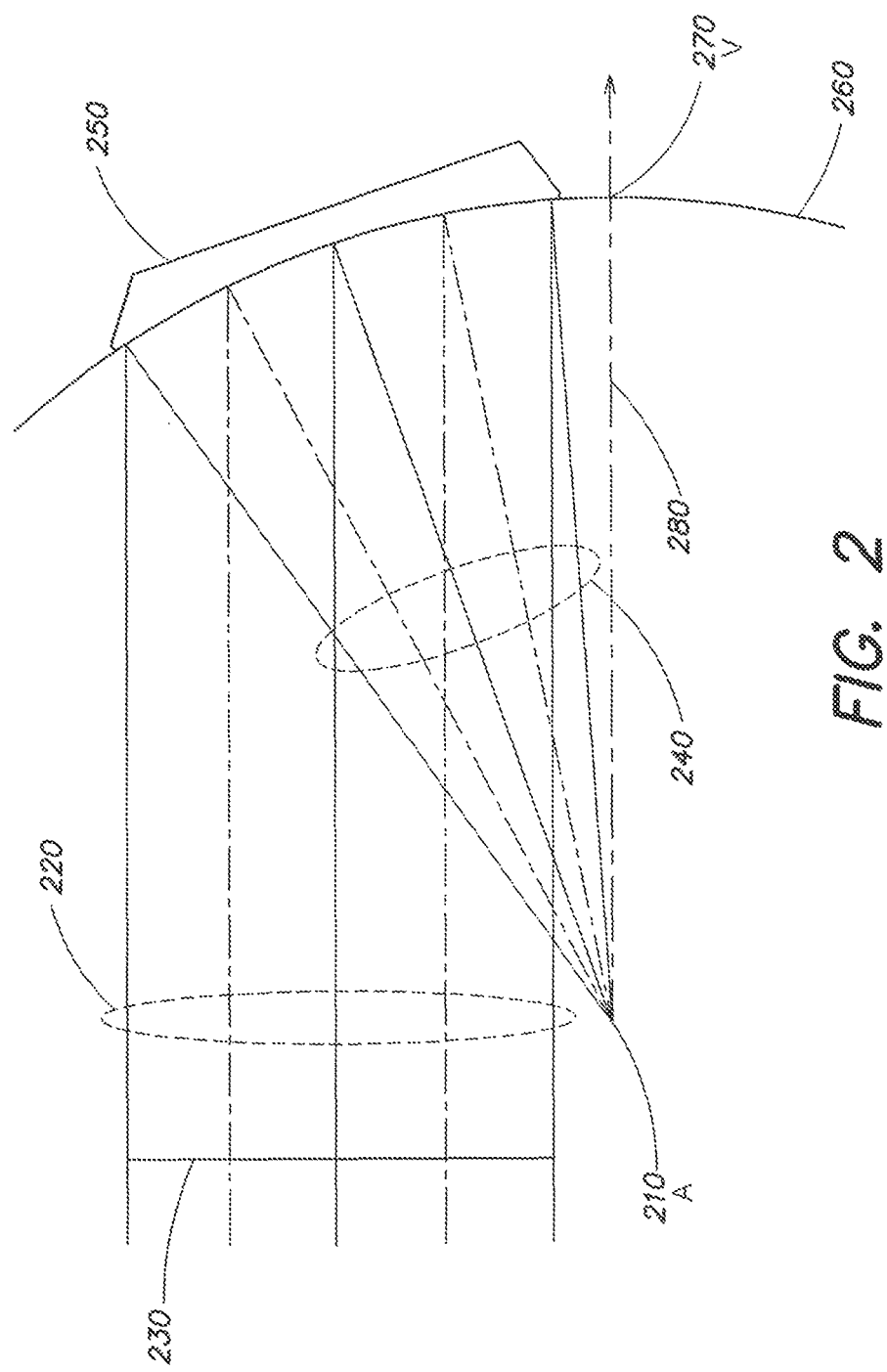
FIG. 2 is a diagram illustrating principles of operation of a parabolic reflector.

Referring to FIG. 2, a perfect point source of electromagnetic (EM) radiation, placed exactly at the focal point 210 ("A") of a perfectly shaped parabolic reflector, produces a reflection from the parabola characterized by an array of perfectly parallel, infinitely narrow bundles of rays 220. Such an arrangement of ideal rays may also represent, and be represented by, a perfectly flat (or planar) wavefront 230. The wavefront also represents the locus of an array of points along an EM beam 240, comprised of a collection of rays, whose energy emanated simultaneously from the source. In FIG. 2, the reflector is implemented as a section of a physical body 250 having a reflective surface that is a portion of a parabola of revolution 260. The parabola of revolution 260 has a vertex 270 ("V") and an axis of symmetry 280.

Such an ideal arrangement of parallel rays and planar wavefronts may also be characterized as a system with a source that is at infinity, or described as a source that is "relayed to infinity" by the reflector. This is because a system that produces an array of parallel rays, or a flat wavefront, is essentially equivalent, mathematically, to a source that is infinitely far away.

These properties also apply to a portion of a parabola (e.g., section 250), and such sections are specified in many applications where use of an entire parabolic surface of revolution is inconvenient or cumbersome. For example, since radiation aimed at the vertex 270 of a parabola returns rays along an optical axis 280 that may be blocked by a source or other mechanical feature, a portion of the parabola 260 is often specified that does not include the on-axis vertex portion of the parabola. Such a parabolic portion is called an off-axis parabola (OAP). Referring again to FIG. 1, in certain examples, the dual-mode reflector 110 may be implemented using an OAP. The optical axis of the parabolic mirror forming the dual-mode reflector 110 is represented at 280. Because the minor is off-axis, the entire parabolic surface is not needed, as discussed above.

Figure 3:
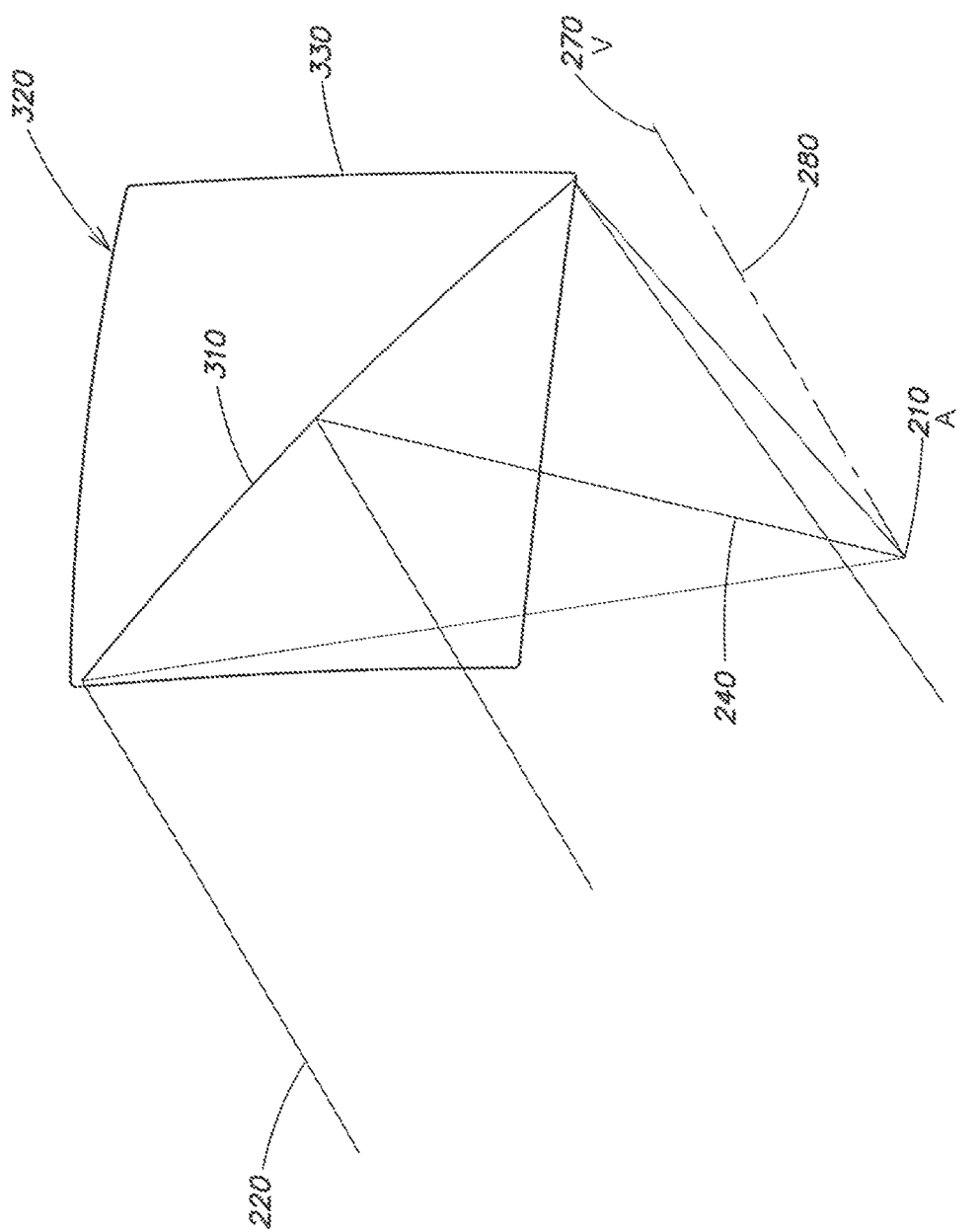
FIG. 3 is a diagram of one example of an off-axis parabolic reflector according to aspects of the present invention.

Looking in a direction towards the reflecting surface of the parabola, for example along the optical axis of the reflector, the shape of the outer edge of the reflective surface may also be selected for reasons of convenience or to facilitate mounting. One example of a mathematical definition for outer edge profile that has shown utility is illustrated in FIG. 3. In this case, the optical axis 280, and the vertex 270 that mathematically define the parabolic surface lie along the diagonal 310 of a square surface 320, with the vertex 270 located off the edge of the square surface defined by the edge profile. In the illustrated example, the surface 320 has a rounded edge 330. The definition of such a surface may be realized by first defining a sufficiently large parabolic surface of revolution, and secondly defining the edge geometry of the parabolic surface.

Figure 4:
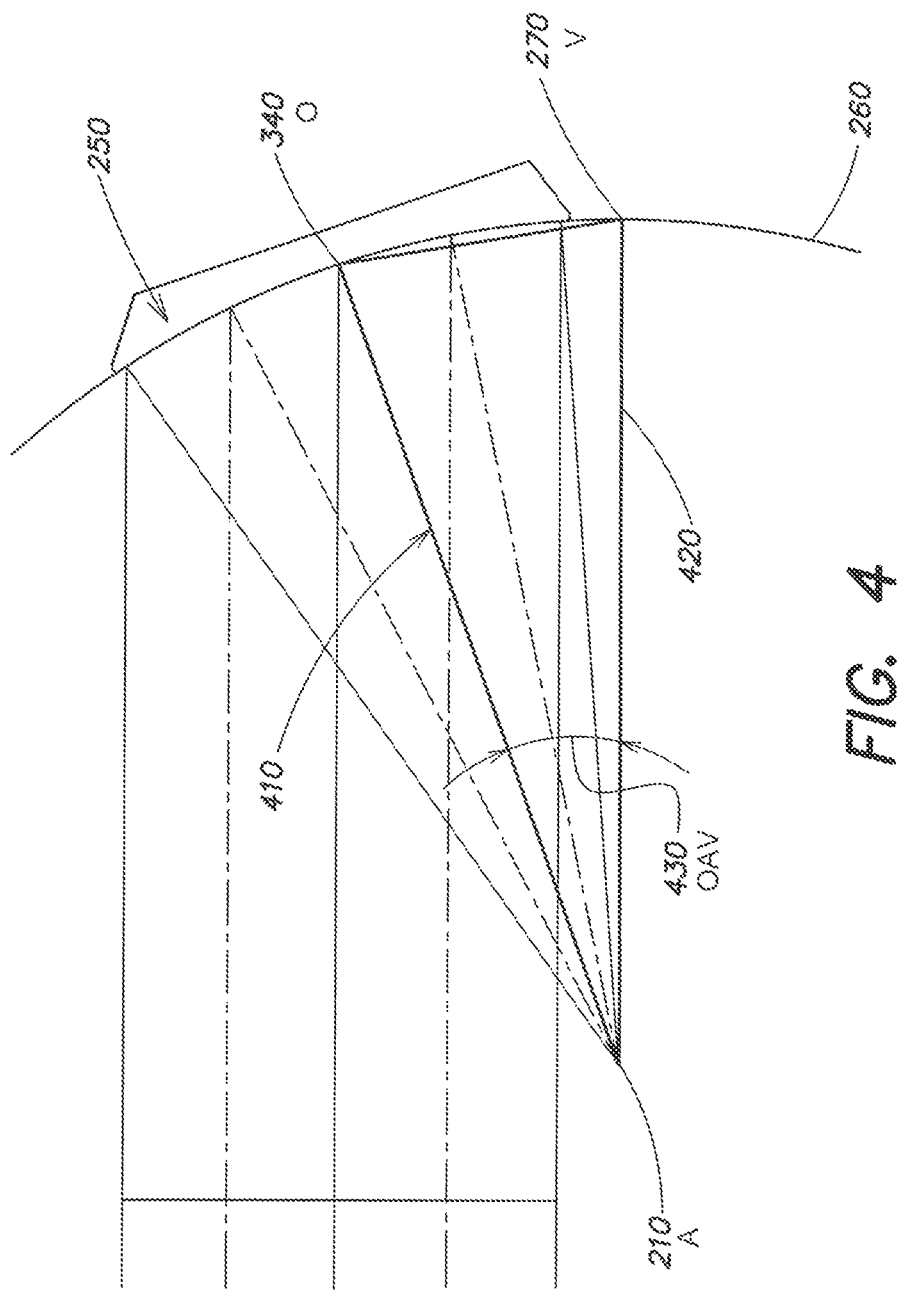
FIG. 4 is a diagram illustrating geometry of an off-axis parabolic reflector according to aspects of the present invention.

As shown in FIG. 4, such a geometry can be defined on the surface of a parabola 260 using the off-axis angle, (OAV) 430 of a triangle 410 formed between the source at focus 210 ("A"), the vertex 270 ("V"), and the center 340 ("O") of the OAP surface 250 and having a side 420 which lies along the axis of the parabola 260. In certain examples, the dual-mode reflector 110 may be configured having a shape substantially as illustrated in FIG. 4.

It is to be appreciated that throughout this description, the term "parabola," although referring to a parabolic surface for expositional purposes, may also refer to any object with the general mathematical properties that a set of at least two emitting sources, located at a selected position, after reflection or other spatial modification by the object creates a beam with desired spatial and directional properties at a desired "test" locus.

An ideal perfect parabolic reflector, beam of parallel rays, and precisely planar wavefront, only exist in a mathematical sense, and therefore represents the ideal, perfect, or limiting case. Any physical realization of this ideal is limited by the finite precision with which the parabolic surface may be created, the source positioned, and by the extent to which the source forms an infinitely small point.

Established techniques may be used to produce the dual-mode reflector 110 having a surface shape that deviates sufficiently slightly from the ideal parabolic surface discussed above. For example, the deviation of a real surface may be defined in terms of the root-mean square (RMS) deviation from the ideal surface. There is a cost associated with this amount of RMS error; lower amounts of RMS error, and thus more accurate surfaces, are generally more costly to produce. Production techniques for spherical and parabolic surfaces, and to some extent hyperbolic and elliptical surfaces, generate different errors and there are different associated costs for some contributors to RMS error than for other contributors. For example, the radius of curvature (ROC) that best matches an actual surface is often a degree of freedom (DOF) that is unimportant in the alignment and positioning of a component of a final system relative to an OAP because this error can be compensated for by slight shifts in the axial position of the component. Alignment techniques that position a source to match the vertex ROC to arbitrary accuracy have also been developed, such as interferometric alignment techniques, for example.

As discussed above, embodiments of the dual-mode reflector 110 are configured to simultaneously reflect the optical signal and the RF signal toward a test volume. According to one embodiment, there is provided on the surface of the dual-mode reflector 110, which otherwise may be of relatively poor optical surface precision, a zone of optical quality surface precision that relays an optical alignment signal into the test volume (toward the UUT 150). In certain examples, the zone of optical quality has between approximately $\lambda/2$ and $\lambda/10$ RMS surface deviation, where $\lambda$ is the optical test wavelength, generally in a range of about 630-635 nm, typically 632.8 nm±2 nm. Simultaneously, an RF signal is relayed into the same test volume by the entire surface of the reflector 110, which although may be of poor optical surface precision, is of sufficient quality for RF performance. Thus, the surface of the dual-mode reflector 110 includes a sub-aperture (i.e., less than the entire surface) high-performance optical zone. In certain examples, the dual-mode reflector 110 is a mirror of nickel on aluminum construction. That is, the mirror may be formed of a base layer of aluminum, with a layer of nickel disposed on the aluminum. However, in other examples, the dual-mode reflector 110 may be made of other materials. For example, the reflector may be made from heat-treated aluminum that is thermally stabilized prior to being machined into the desired shape. The aluminum further may be annealed during formation of the optical quality zone, and optionally at the end of the manufacturing process. The surface of the dual-mode reflector 110 may be finished and/or polished to a level of surface precision or surface quality that is sufficient for the reflector to adequately reflect the RF signal into the test volume. In certain examples, the surface of the dual-mode reflector has between approximately 25 and 250 μm RMS surface deviation. Additionally, as discussed above, a portion of the surface of the dual-mode reflector 110 is further finished and/or polished to an improved level of surface precision or surface quality, such that at least that portion of the reflector surface (referred to as the optical quality zone) may adequately reflect optical signals into the test volume. The surface finishing and/or polishing may be performed using any of a variety of known techniques, including, for example, magnetorheological finishing, diamond point turning, mechanical and/or chemical polishing, or any combination of such techniques.

Figure 5:
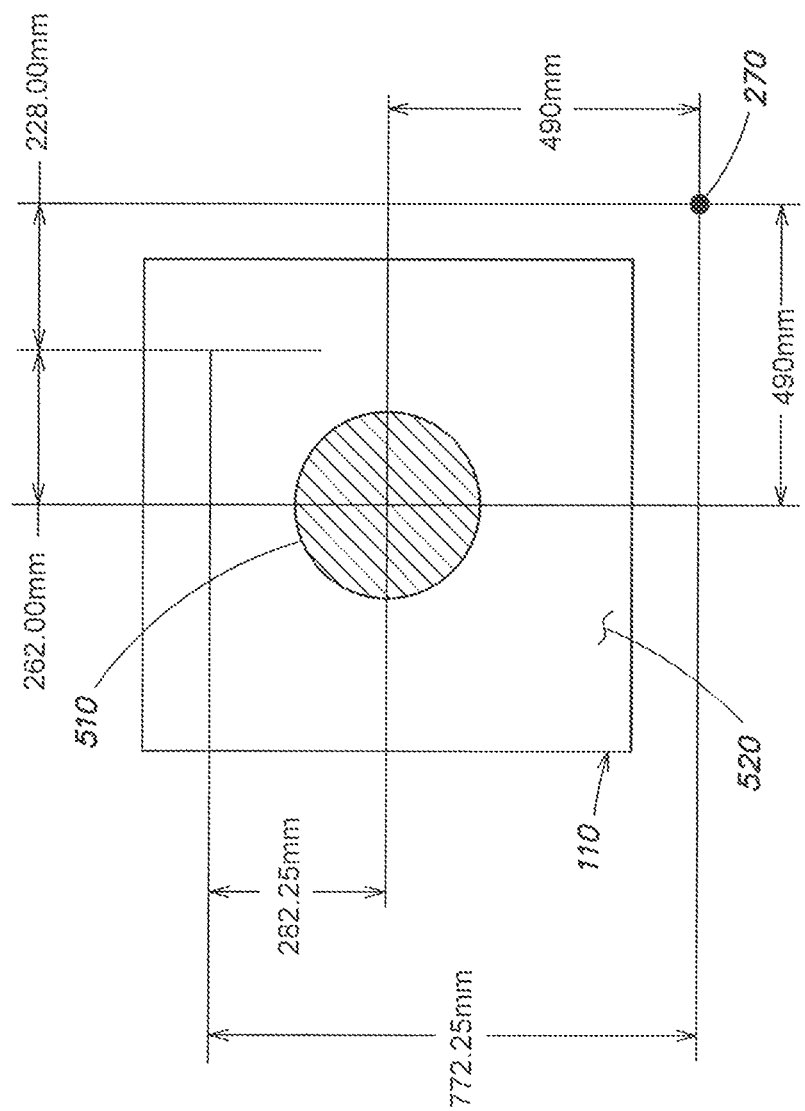
FIG. 5 is a diagram of one example of a dual-mode optical and RF reflector having an optical quality zone according to aspects of the present invention.

FIG. 5 illustrates in plan view one example of the dual-mode reflector 110 including an optical quality zone 510 having improved surface precision, as discussed above. In the illustrated example, the optical quality zone 510 is located approximately in the center of the surface 520 of the dual-mode reflector 110 and is approximately circular in shape. However, in other examples, the optical quality zone 510 may be located further off-axis (i.e., not in the center or approximate center of the dual-mode reflector 110), and may be other than circular in shape (e.g., rectangular, octagonal, non-geometrically shaped, etc.). The example illustrated in FIG. 5 provides exemplary dimensions for one embodiment of the dual-mode reflector 110, in which the optical quality zone 510 has a diameter of 250 millimeters (mm). However, this example is merely illustrative and not intended to be limiting. The dual-mode reflector 110 may be sized and shaped depending on the application, and as discussed above, the optical quality zone 510 may have any number of different shapes, sizes, and locations on the surface 520 of the dual-mode reflector 110, not limited to the example shown in FIG. 5.

In certain examples, the optical quality zone 510 may be located in a position on the dual-mode reflector 110 such that is substantially centered on the axis of the RF test volume into which the signals 140 are relayed by the reflector. This volume is typically the "quiet zone" (QZ) of the RF system, namely, the zone of best RF performance for the RF test chamber. In one embodiment, the multi-mode signal emitter 130 emits a "beacon" or image of a small optical source that is co-located at a common phase center with the RF emission, as discussed above. This co-located optical beacon provides a fixed reference point in space for a co-alignment test process. In one example, the optical beacon is an infrared signal; however, in other examples the optical beacon may be a signal in the visible spectrum.

Figure 6:
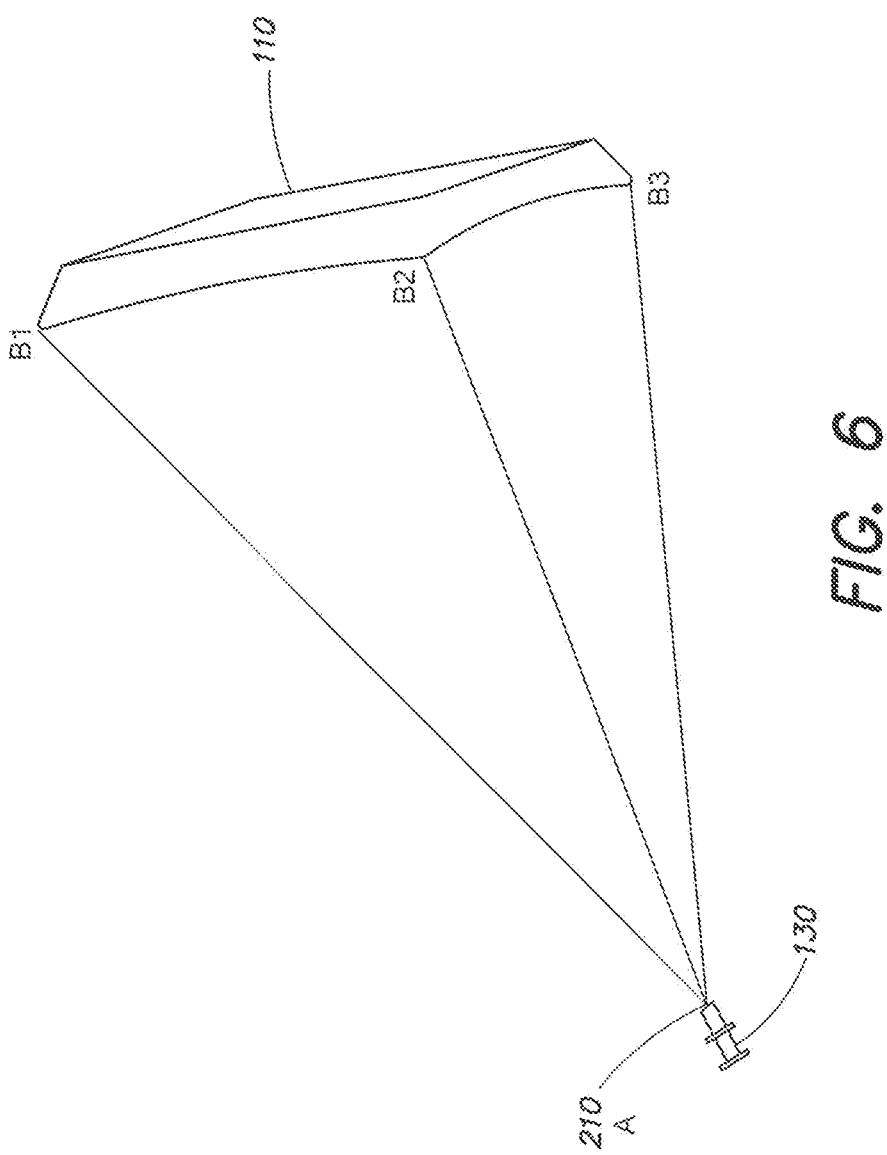
FIG. 6 is a diagram illustrating one example of a geometric relationship between a signal source and an off-axis parabolic reflector.

An important design consideration for an OAP to be used at RF frequencies, as may be the case for the dual-mode reflector 110, is the effect of diffraction of RF energy from the edge of the OAP on the uniformity and temporal stability of the standing wave pattern generated in the test volume or QZ. In certain examples, the edges of OAP reflector may be modified to reduce the amount and type of diffractive edge scatter so as to improve QZ uniformity and reduce ripples due to slight variations in the shape of emitted waveforms, improving temporal and spatial stability. Examples of edge modifications include edges having periodic "spikes" or protrusions rather than being smooth, or rounded or beveled edges. However, even with edge modifications, an OAP reflector may cause background signals in the QZ resulting, at least in part, from the OAP geometry. For example, referring to FIG. 6, the distance from the RF emitter/source 210 to edges of the OAP reflector 250 is different for source emissions reflected from one edge of the reflector than from another. In other words, the source or focus to corner distances are different: A-B1≠A-B2≠A-B3. This property usually results in ripples in the amplitude of signals scattered from the reflector edge, creating a level of irregular background that affects the noise level and quality of the QZ. This results from a difference in diffraction, and in the shape of the diffraction pattern generated by one portion of the rounded edge of the reflector 250 compared to another. Additionally, subsequently reflections of these diffracted emissions by the test chamber may contribute to further reductions in the quality of the QZ.

According to certain embodiments, the dual-mode reflector 110 and multi-mode signal emitter 130 are arranged to compensate for the diffraction effects and improve uniformity of the RF signal amplitude in the QZ. The diffraction difference discussed above is affected the output direction of the RF emitter. Accordingly, the emission angle of the multi-mode source may be optimized to provide best QZ performance. In particular, the multi-mode signal emitter 130 may be aimed such that its emission direction does not lie along the signal axis 135 (from points 210 ("A") to 340 ("O") in FIG. 4). Rather, the emission angle of the multi-mode signal emitter 130 is re-aimed or tilted further off-axis around the cardinal or focal point 280 (A) of the reflector 110 with respect to the input axis of the dual-mode reflector 110. This tilt compensates for the fact that one edge of the dual-mode reflector 110 is geometrically closer to the multi-mode signal emitter 130 than the others, and closer reflector portions will intercept a larger solid angle, resulting in higher signal amplitude in that portion of the collimated beam. Without this RF compensating tilt, asymmetrical edge diffraction resulting from the difference in distance of the reflector edges from the multi-mode signal emitter 130 would strongly affect the quiet zone signal quality, as discussed above. It should be noted that this angular "re-aiming" occurs while the multi-mode signal emitter 130 remains correctly positioned at the focus of the dual-mode reflector 110; only the angular direction of the RF feed is changed.

Figure 7A:
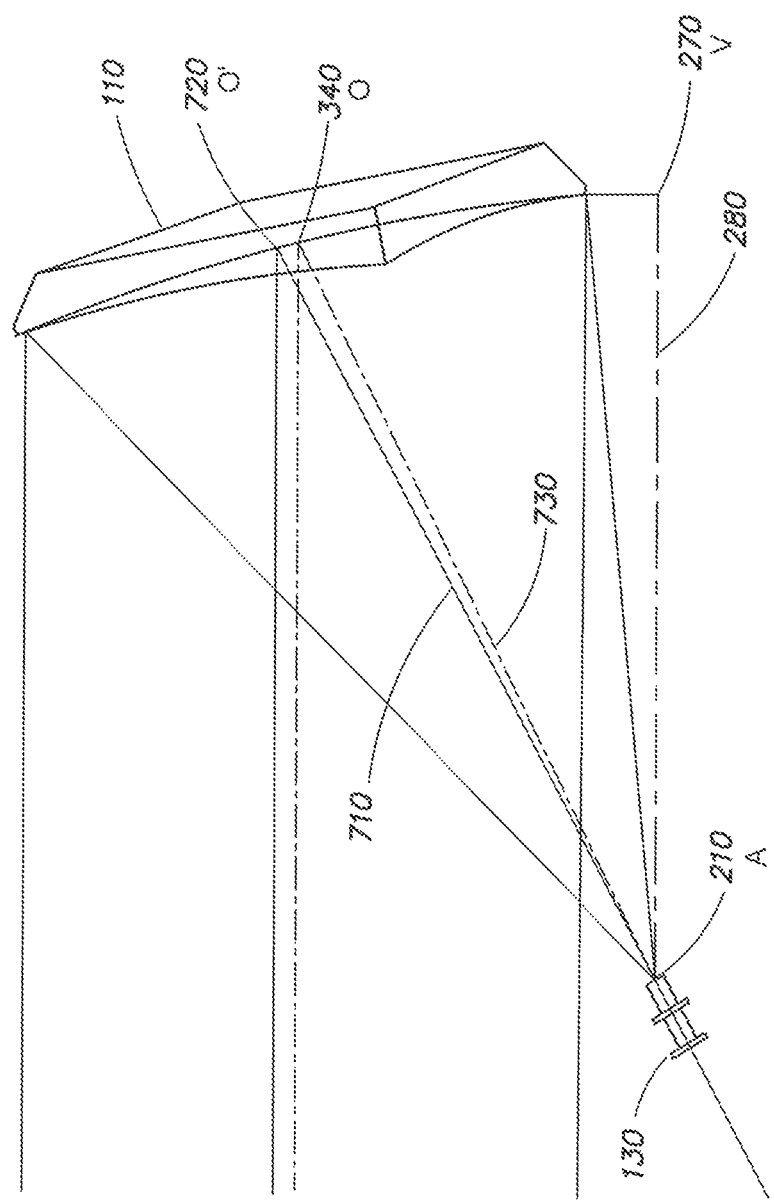
FIG. 7A is a diagram illustrating another example of a geometric relationship between a signal source and an off-axis parabolic reflector according to aspects of the invention.
Figure 7B:
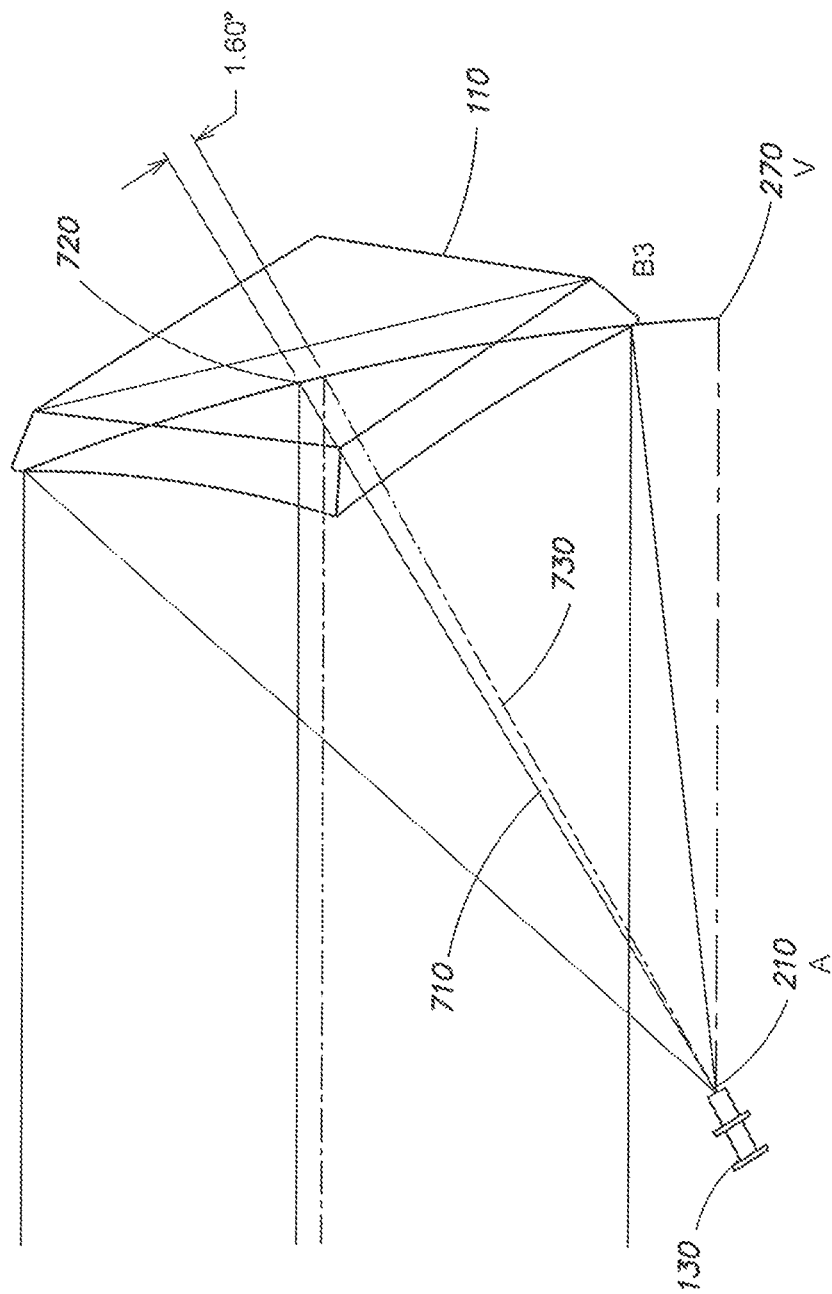
FIG. 7B is another view of the diagram of FIG. 7A.

Referring to FIGS. 7A and 7B there is illustrated an example of the above-described angular re-aiming. In the example illustrated in FIGS. 7A and 7B, the multi-mode signal emitter 130 is arranged such that the central RF ray 710 is aimed slightly towards the higher edge, and thus defines a central reflection point 720 located above point "O". The central RF ray 710 and central reflection point 720 are, respectively, offset from the geometric center 340 ("O") of the dual-mode reflector 110 and corresponding "un-tilted" central ray, represented by dashed line 730. FIG. 7B illustrates an example of the angular offset or tilt, which is shown as 1.6°; however, this example is illustrative only and not intended to be limiting. In some cases, the amount and direction of this re-aiming is determined experimentally after fabrication for a specific OAP, optimizing the quality of the QZ for a particular use. In this case, the exact amount of re-aiming may not be known before the OAP is fabricated installed and tested.

As discussed above, in certain examples, the multi-mode signal emitter 130 includes an optical emitter configured to produce an optical beam to be reflected off a portion of the dual-mode reflector 110 that is polished to optical quality (the optical quality zone 510 discussed above) to create, by reflection, an optical beacon coincident in apparent spatial position with the RF emitter. However, unless otherwise addressed, the above-discussed RF compensating tilt may cause the optical signal from the multi-mode signal emitter 130 to partially or entirely miss the optical quality zone 510. Therefore, in certain examples, the optical quality zone 510 may be implemented to have sufficient radial size and/or decenter to compensate for the difference in position of points 270 versus 340, and to ensure that the optical signals from the multi-mode signal emitter 130 are relayed into the quiet zone, or as needed in the field of the UUT 150. The desired size and positioning of the optical quality zone 510 may be expressed in terms of a geometric formula, as discussed below. Additionally, the following formulas and relationships may be used to optimize the tilt and quality of the optical signals.

Figure 8A:
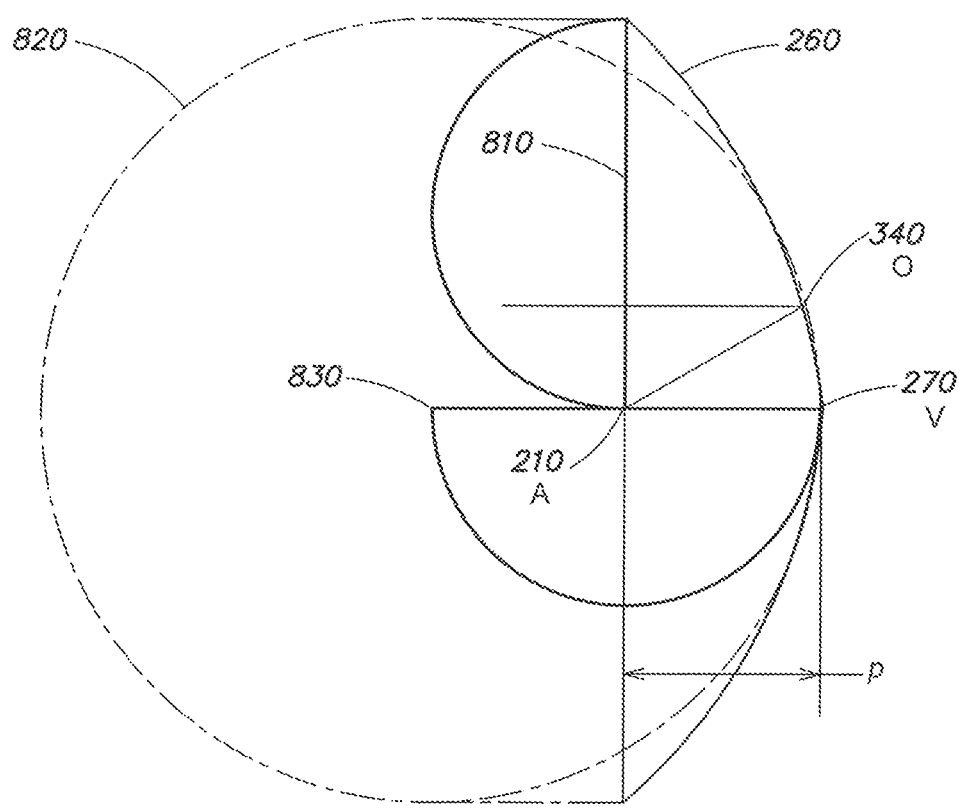
FIG. 8A is a diagram illustrating parabolic geometry according to aspects of the invention.

Referring to FIG. 8A, parabolic geometry requires that, p, the distance from the parabolic focus point 210 ("A" in FIG. 8A) to the vertex 270 of the parabola ("V" in FIG. 8A) is half the radius of curvature (ROC) of circle 820, and that the vertical distance (represented by line 810) from the parabola focus point to an upper intersection with the parabola 260 is one ROC or 2p. Circle 820 is a circle with the same radius of curvature as the instantaneous curvature at the vertex of the parabola 260 and having a center 830. These conditions make the overall height of the parabola along a line through the focus equal to 4p. The two semi-circles illustrated in FIG. 8A are identical, each having radius p. The point labeled "O" corresponds to the center 340 of an OAP surface (e.g., of dual-mode reflector 110).

Figure 8B:
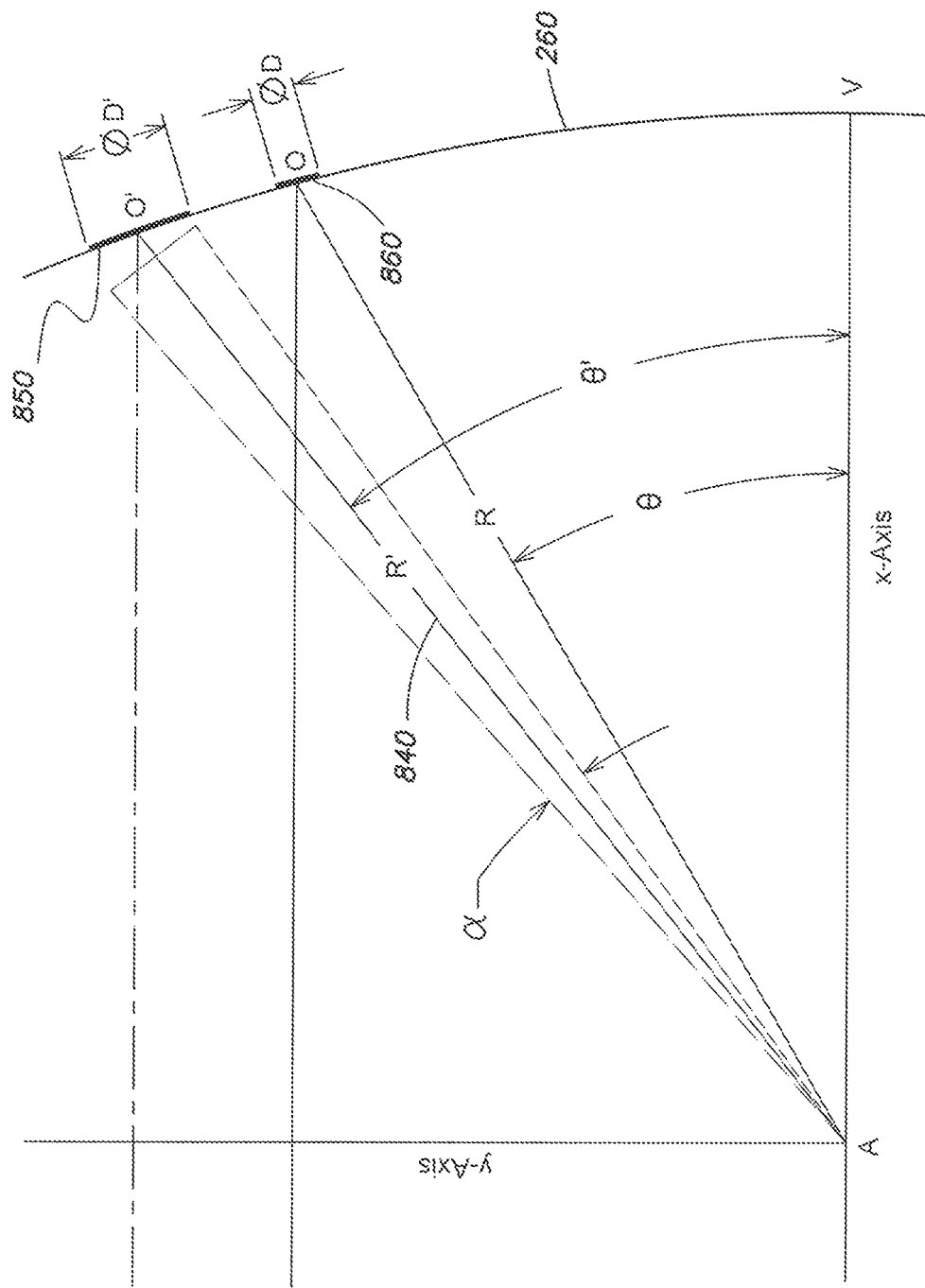
FIG. 8B is a diagram illustrating another example of a geometric relationship between a signal source and an off-axis parabolic reflector according to aspects of the invention.

Referring to FIG. 8B, for a parabola 260 with a focus at A and a vertex at V, with parabolic vertex radius ROC, and where θ=∠OAV, the distance from the focus point to the surface of the parabola (R) is given by:

$$R = \frac{ROC}{1 + \cos(\theta)} \qquad (1)$$

Equation (1) is taken from Larson, "Calculus with analytic geometry" $3_{rd}$ Ed. 1986, Heath and Company, pp 653-657).

As shown in FIG. 8B, a coordinate system may be defined with origin at the parabolic focus (A), an x-axis along A-V, and a y-axis perpendicular to the x-axis at the focus point, A. In this coordinate system, the location x, along the x-axis of the parabolic intersection point of R at O is given by Equation (2) below, and the height, y, along the y-axis is given by Equation (3) below.

$$x = R \cos \theta \qquad (2)$$

$$y = R \sin \theta \qquad (3)$$

Then for a similar system, for a re-aiming angle θ' and re-aimed distance R', the resulting positions in the coordinate system are x' and y', given by Equations (2) and (3). The distance between these two points (distance between O and O') is given by:

$$S = \sqrt{(x-x')^2 + (y-y')^2} \qquad (4)$$

As shown in FIG. 8B, an optical beam 840 of a specific angular extent, α, centered on line AO', that covers a portion 850 of the parabola 260 having a diameter D' can entirely miss a zone of optical quality, positioned at portion 860 and having a diameter D, that is of insufficient radial size or decenter. For the purposes of this disclosure, the angular extent α is defined as the angular point in the optical beam 840 which is of sufficient irradiance to produce a minimally acceptable signal when reflected from the parabolic surface of the optical quality zone 510; the beam is further defined such that beyond this point, if the beam exists at all, it is insufficient to produce an acceptable signal after intersecting the ordinary surface of the dual-mode reflector 110. Thus, for symmetric geometries ½ of D plus ½ of D' must be less than or equal to S for the optical quality zone 510 and D' to overlap adequately to produce an acceptable signal. The symmetric case is explained above for purposes of illustration only; those skilled in the art will appreciate that equivalent geometric conditions may be produced by decentration or shifting of D in one or more dimensions along the parabolic surface.

Figure 9:
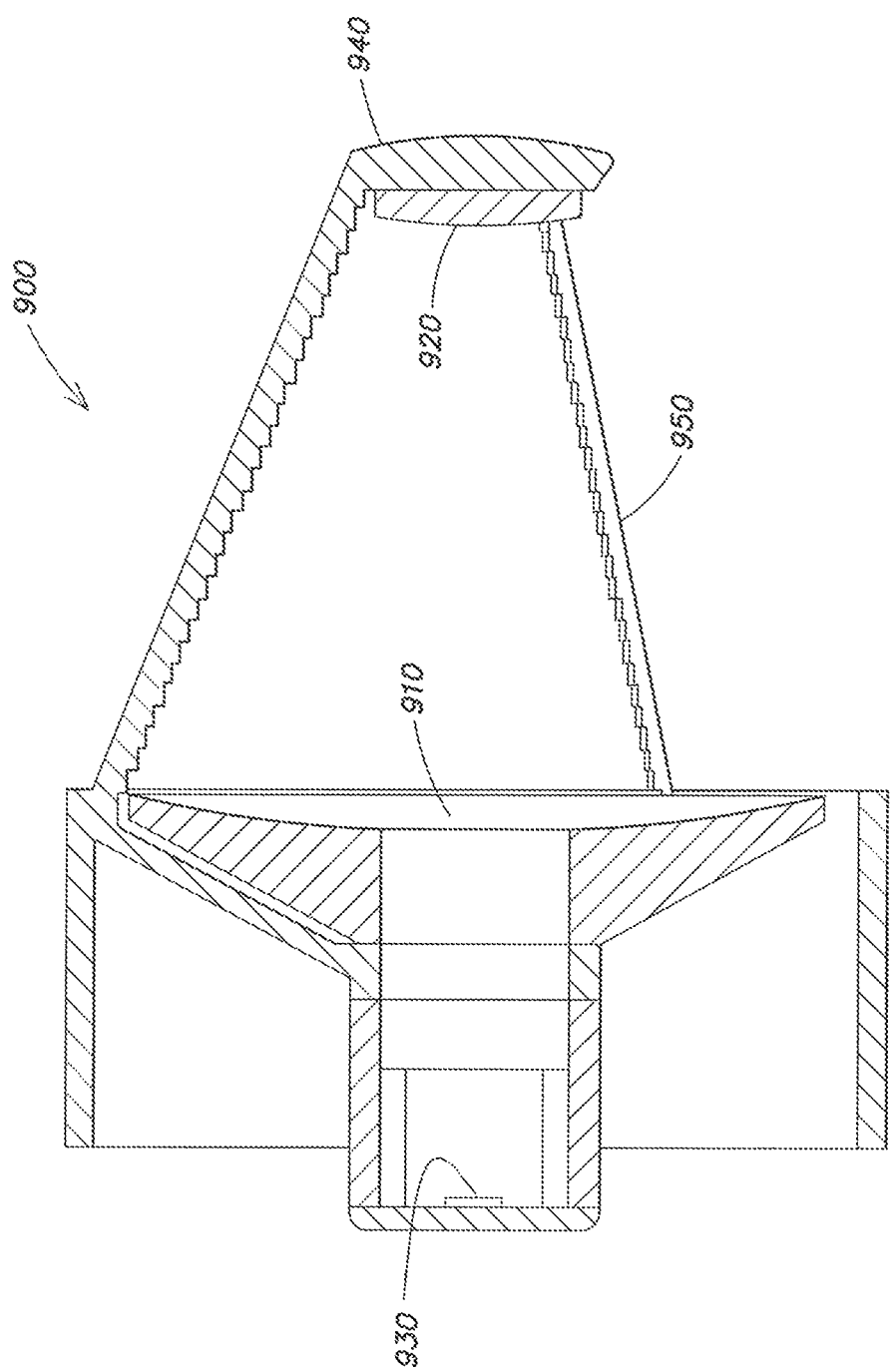
FIG. 9 is a cross-sectional view of one example of an optical system of a possible test article, the optical system including a central obscuration.

In certain applications, the test article being tested using the chamber, dual-mode reflector 110, and apparatus discussed above includes an optical system with a central obscuration. FIG. 9 illustrates one example of such an optical system. In this example, the optical system of the unit under test 900 includes a primary mirror 910 and a secondary minor 920 that reflect a received signal to a detector 930. The primary minor 910 collects incoming light and reflects it to the secondary minor 920, which in turn reflects it to the detector 930. The system further includes structure to house the detector, hold the primary and secondary minors 910 and 920 in place, and connect to external components, such as a gimbal, for example. This structure includes, among other components, a secondary minor holder 940 which is part of metering structure 950 shown in FIG. 9. The secondary minor holder 940 is necessarily opaque to incoming optical radiation, creating a central obscuration. When such test articles are being tested, it is possible that O' (FIG. 8B) may be small and "hidden" behind the central obscuration from the viewpoint of the detector 930. In other words, the central obscuration may be larger than the extent of the reflected optical test beacon, resulting in blockage of the test beacon, rendering it useless for test purposes. To avoid this situation, the diameter of the ray bundle from region 850 in FIG. 8B (the extent of the optical test beacon) can be made sufficiently large, and/or sufficiently decentered to at least partially miss the central obscuration. Accordingly, in addition to the considerations discussed above with reference to FIGS. 6-8B, the optical quality zone 510 can also be made with a sufficient size, decenter, or combination of both, to avoid issues associated with those test articles containing central obscurations.

Thus, aspects and embodiments provide a dual-mode reflector having a zone of improved, optical quality, surface precision on its surface, which is otherwise of much lower precision, but sufficient for RF reflection. With this construction, the dual-mode reflector 110 may be used to simultaneously relay both an RF signal and an optical signal to devices under test or other components configured to receive and process the signals. As discussed above, the optical quality zone 510 may be of sufficient size (e.g., diameter) and/or decentration/offset to allow for tilting of the multi-mode signal emitter 130 about a fixed input point for purposes of improving RF signal amplitude, without putting the optical signal entirely outside of the zone. The optical quality zone may be optimized for signal level of mixed signal parameters, including, for example, off-axis parabola focal length, quiet zone offset, optical beam divergence, etc., as discussed above. In certain examples, the dual-mode reflector 110 may include a minor formed from a plated bi-metallic structure with a thinner polishing layer on top of a substrate. In one example, the bi-metallic structure is nickel plated onto aluminum. In other words, the substrate may be aluminum, and the polishing layer may be nickel. As discussed above, in certain examples the reflector surface may be substantially described as a parabola, off-axis parabola, or polynomial surface with a substantial second order coefficient.

Embodiments of the dual-mode RF and optical reflector 110 may be used as an aid in performing methods of system alignment, as discussed above. According to certain embodiments, the optical quality zone 510 may be used to reflect an optical beacon that can be used as an aid in co-alignment of RF and optical signals, for example, for purposes of boresight testing or alignment of co-aligned RF and optical sources. In certain examples, the use of the optical beacon may greatly improve the ability to accurately align or boresight an RF system. Conventionally, alignment precision on the order of about 2 mm can be achieved for alignment of an RF source to the focus of an off-axis parabolic reflector. In contrast, using an optical beacon (e.g., from the multi-mode source 130), the dual-mode optical and RF reflector 110, and interferometric optical alignment techniques, this alignment precision may be improved to better than about 3 µm. Generally, interferometric alignment techniques are well known; however, it has been found advantageous to use a LUPI (Laser Unequal Path Interferometer) with a reference and return flat in the quiet zone, at the UUT position, and the expansion point of the laser at the focus of the OAP, to conduct this alignment. The synergistic benefit of easily achieving excellent alignment precision using simple interferometric techniques may allow test systems incorporating embodiments of the dual-mode optical and RF reflector 110 to achieve better than conventional alignment and a higher level of test system performance. Additionally, the dual-mode optical and RF reflector is compatible with a folded antenna range/test chamber configuration, which allows for a high performance test environment to be implemented in a relatively small area.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A dual-mode optical and radio frequency (RF) reflector comprising:
a mirror having a reflective surface including a first zone having a first surface precision, a remainder of the reflective surface outside of the first zone having a second surface precision that is substantially lower than the first surface precision,
wherein the mirror is positioned to receive an RF signal and an optical signal, the RF signal and the optical signal having a common phase center, and wherein the mirror is configured to collimate and reflect the RF signal from the reflective surface and collimate and reflect the optical signal from the first zone as co-aligned plane wave signals with the common phase center.

2. The dual-mode optical and RF reflector of claim 1 wherein the reflective surface has an off-axis parabolic shape.

3. The dual-mode optical and RF reflector of claim 2 wherein the first zone is substantially centrally located in the reflective surface.

4. The dual-mode optical and RF reflector of claim 3 wherein the first zone has a diameter of approximately 250 millimeters.

5. The dual-mode optical and RF reflector of claim 2 wherein the first zone is offset relative to a center of the reflective surface.

6. The dual-mode optical and RF reflector of claim 1 wherein the mirror includes a first layer of aluminum and a second layer nickel disposed on the first layer of aluminum.

7. The dual-mode optical and RF reflector of claim 1 wherein the mirror is made from heat-treated and thermally stabilized aluminum.

8. The dual-mode optical and RF reflector of claim 1 wherein the first surface precision is in a range of $\lambda/2$ to $\lambda/10$ RMS surface deviation, $\lambda$ being the wavelength of a surface metrology test signal in a range of approximately 630 nm to 635 nm.

9. A multi-mode alignment test system comprising:
a test chamber;

a multi-mode signal emitter configured to emit at least a radio frequency (RF) signal and an optical signal, the RF signal and the optical signal having a common phase center; and a dual-mode optical and RF reflector including a mirror having a reflective surface configured to collimate and reflect the RF signal into a test volume within the test chamber, the mirror including a zone within the reflective surface and corresponding to a portion of the reflective surface that is less than an entirety of the reflective surface, a remainder of the reflective surface outside of the zone having a surface precision that is lower than a surface precision of the zone, the zone being configured to collimate and reflect the optical signal into the test volume, wherein the reflective surface and the zone within the reflective surface are configured to collimate and reflect the RF signal and the optical signal as co-aligned plane wave signals with the common phase center.

10. The multi-mode alignment test system of claim 9 wherein the multi-mode signal emitter is configured to emit the RF signal and the optical signal coincident with one another.

11. The multi-mode alignment test system of claim 9 wherein the mirror has a bi-metallic structure.

12. The multi-mode alignment test system of claim 11, wherein the mirror includes an aluminum substrate and a layer of nickel disposed on the aluminum substrate, the layer of nickel being polished to provide the reflective surface.

13. The multi-mode alignment test system of claim 9 wherein the dual-mode optical and RF reflector has an off-axis parabolic shape.

14. The multi-mode alignment test system of claim 9 wherein the zone is approximately centrally located within the reflective surface.

15. The multi-mode alignment test system of claim 9 wherein the zone is offset from a center of the reflective surface.

16. The multi-mode alignment test system of claim 15 wherein the test system is configured for testing an article including an optical system having a central obscuration, and wherein a size and a decenter of the zone is selected such that optical signal reflected from the zone is not blocked by the central obscuration.

* * * * *

UNITED STATES PATENT AND TRADEMARK OFFICE
CERTIFICATE OF CORRECTION

PATENT NO. : 10,042,095 B2
APPLICATION NO. : 14/813635
DATED : August 7, 2018
INVENTOR(S) : John Okerson Crawford et al.

Page 1 of 1

It is certified that error appears in the above-identified patent and that said Letters Patent is hereby corrected as shown below:

In the Specification

Column 2, Lines 14-19 should read:
For example, the mirror may include an aluminum substrate and a layer of nickel disposed on the aluminum substrate, the layer of nickel being polished to provide the reflective surface. In another example, the mirror can be made from heat-treated and thermally stabilized aluminum.

Column 5, Lines 53-57 should read:
Accordingly, the dual-mode reflector 110 may be a mirror configured to collimate RF and optical (e.g., IR) beams and simulate "far-field" performance with the signal emitter 130 apparently (although not in actuality) located at infinity.

Column 6, Lines 28-29 should read:
Because the mirror is off-axis, the entire parabolic surface is not needed, as discussed above.

Column 10, Line 66 – Column 11, Line 11 should read:
In this example, the optical system of the unit under test 900 includes a primary mirror 910 and secondary mirror 920 that reflect a received signal to a detector 930. The primary mirror 910 collects incoming light and reflects it to the secondary mirror 920, which in turn reflects it to the detector 930. The system further includes structure to house the detector, hold the primary and secondary mirrors 910 and 920 in place, and connect to external components, such as a gimbal, for example. This structure includes, among other components, a secondary mirror holder 940 which is part of metering structure 950 shown in FIG. 9. The secondary mirror holder 940 is necessarily opaque to incoming optical radiation, creating a central obscuration.

Column 11, Lines 43-46 should read:
In certain examples, the dual-mode reflector 110 may include a mirror formed from a plated bi-metallic structure with a thinner polishing layer on top of a substrate.

Signed and Sealed this
Thirtieth Day of October, 2018

Andrei Iancu
*Director of the United States Patent and Trademark Office*